United States Patent [19]

Serlin et al.

[11] 4,205,211

[45] May 27, 1980

[54] SURFACE ALLOYING APPARATUS INCLUDING SAFETY CIRCUIT

[75] Inventors: Richard A. Serlin, 10 Barbour La., Bloomfield Hills, Mich. 48013; Thomas A. Field, Rochester, Mich.

[73] Assignees: Alloying Surfaces, Inc., Troy, Mich.; Richard A. Serlin, Bloomfield Hills, Mich.

[21] Appl. No.: 854,134

[22] Filed: Nov. 23, 1977

[51] Int. Cl.² .............................................. B23K 9/10
[52] U.S. Cl. .............................. 219/76.13; 219/130.4; 219/132
[58] Field of Search .............. 219/98, 113, 132, 76.13, 219/130.4, 69 S

[56] References Cited

U.S. PATENT DOCUMENTS

| 2,617,913 | 11/1952 | Oestreicher | 219/132 |
| 3,277,266 | 10/1966 | Blaszkowski | 219/76.13 |
| 3,277,267 | 10/1966 | Blaszkowski | 219/76.13 |
| 3,415,971 | 12/1968 | Shaffer | 219/76.13 |
| 3,741,426 | 6/1973 | Inoue | 219/76.13 |
| 3,932,724 | 1/1976 | Raycher | 219/98 |
| 4,019,017 | 4/1977 | Sitek et al. | 219/130.4 |

Primary Examiner—B. A. Reynolds
Assistant Examiner—Clifford C. Shaw
Attorney, Agent, or Firm—Harness, Dickey & Pierce

[57] ABSTRACT

An improved apparatus for alloying a surface of a workpiece of the type in which an electrode, formed of the alloying material, is connected to a pulse generating machine which creates repetitive spark discharges between the electrode and the workpiece when the electrode is in engagement with the workpiece, the improvement being a safety circuit which prevents energization of the electrode until it is engaged with the workpiece.

2 Claims, 2 Drawing Figures

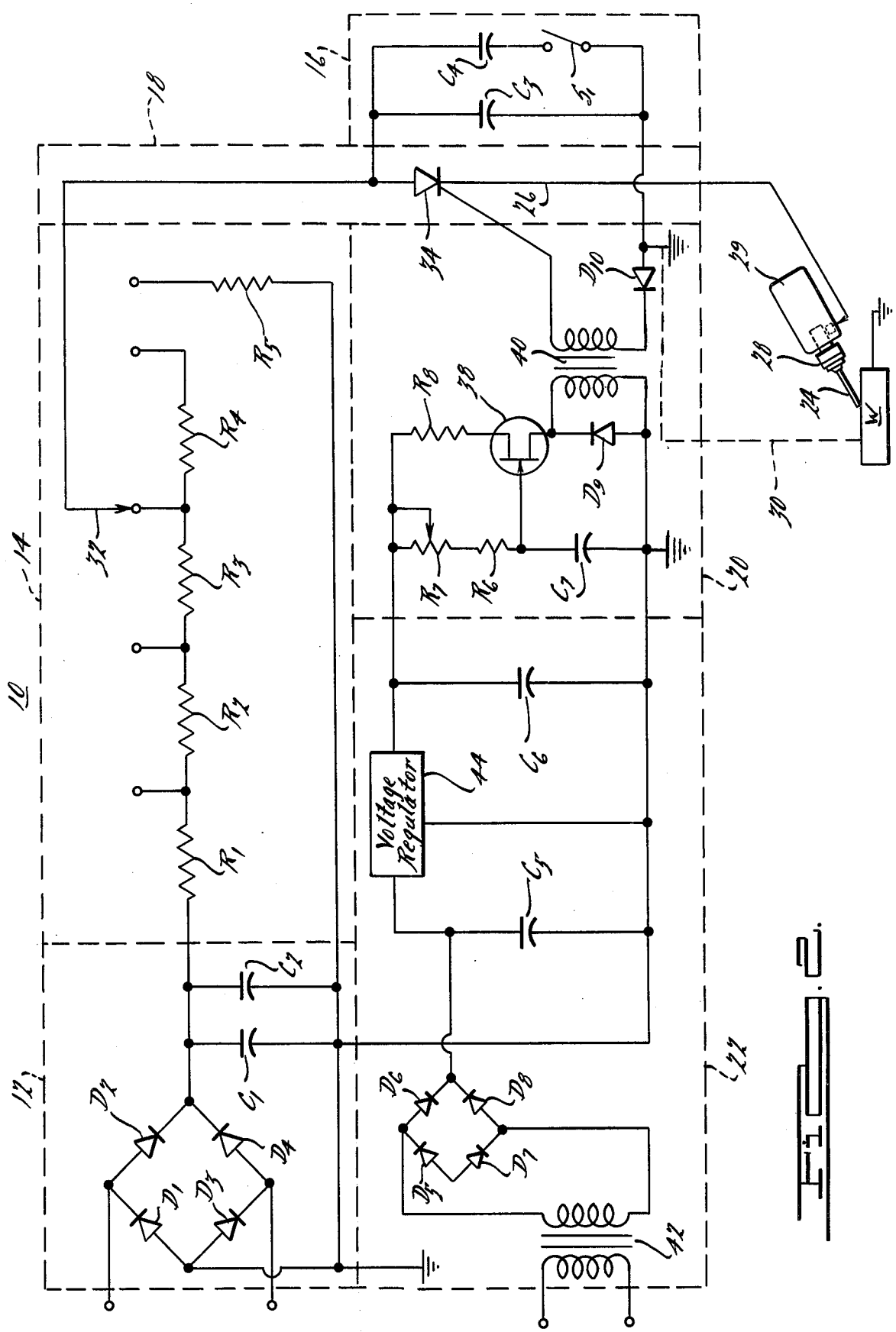

SURFACE ALLOYING APPARATUS INCLUDING SAFETY CIRCUIT

BACKGROUND OF THE INVENTION

In a commercial process for forming an alloy on the surface of a substrate, an electrode which is formed of the allowing material is connected to a pulse generating machine to create repetitive spark discharges between the electrode and the substrate while the electrode is in engagement with the substrate. The electrode may be rotated while in engagement with the substrate and caused to traverse the surface of the electrode to distribute the alloying material over the surface of the substrate. In this commercial process, it is believed that small amounts of the electrode material melt during each discharge and are transferred to the substrate. The discharge is also effective to either melt, soften or otherwise create a condition for alloying at the surface of the substrate so that the electrode material forms an alloy with the substrate material at the zone contiguous with the surface.

To create the repetitive spark discharge, the electrode must be energized with an electric potential. In the past use of this process, a suitable electric potential has been between 110 and 165 volts.

By virtue of recent regulatory actions, a 50 volt limitation has been imposed on equipment such as the above surface alloying apparatus. Particularly, recent regulations specify that an operator who inadvertently contacts the probe must not be exposed to a potential of greater than 50 volts. Of course, it is possible to merely step down the operating voltage of the apparatus from past voltage levels to less than 50 volts. However, applicants have discovered that an operating voltage of less than 50 volts results in a substantial reduction in performance of the apparatus.

In accordance with the present invention, applicants have provided a safety circuit for surface alloying apparatus and the like which preserves the performance of the apparatus and yet exposes the operator to a minimal voltage on the electrode should the operator inadvertently contact the electrode. The safety circuit can be implemented with a minimum number of components and alternations to pre-existing circuits, and hence, provides an extremely effective yet low cost solution to the problem posed by the new regulations.

According to applicants' invention, the firing circuit which connects the electrode to the source of electric potential to create the spark discharges is enabled only when the electrode is in electrical contact with the workpiece. This has been accomplished by providing a triggering circuit which incorporates the workpiece and the electrode so that the circuit which supplies a triggering pulse to the triggering device is completed only when the electrode is in engagement with the workpiece. Hence, prior to the electrical connection of the electrode and the workpiece by engagement therebetween, the triggering circuit is not completed so that triggering cannot be accomplished. When the electrode and the workpiece are electrically engaged, the triggering circuit is completed so that triggering will occur and the process can proceed. When the process is in operation, the engagement between the electrode and the workpiece itself receives the high potential discharges of the electrode and thereby protects the operator.

BRIEF DESCRIPTION OF THE DRAWINGS

FIG. 2 is a circuit diagram of an exemplary apparatus according to the present invention.

DETAILED DESCRIPTION OF THE PREFERRED EMBODIMENT

Figure 1:
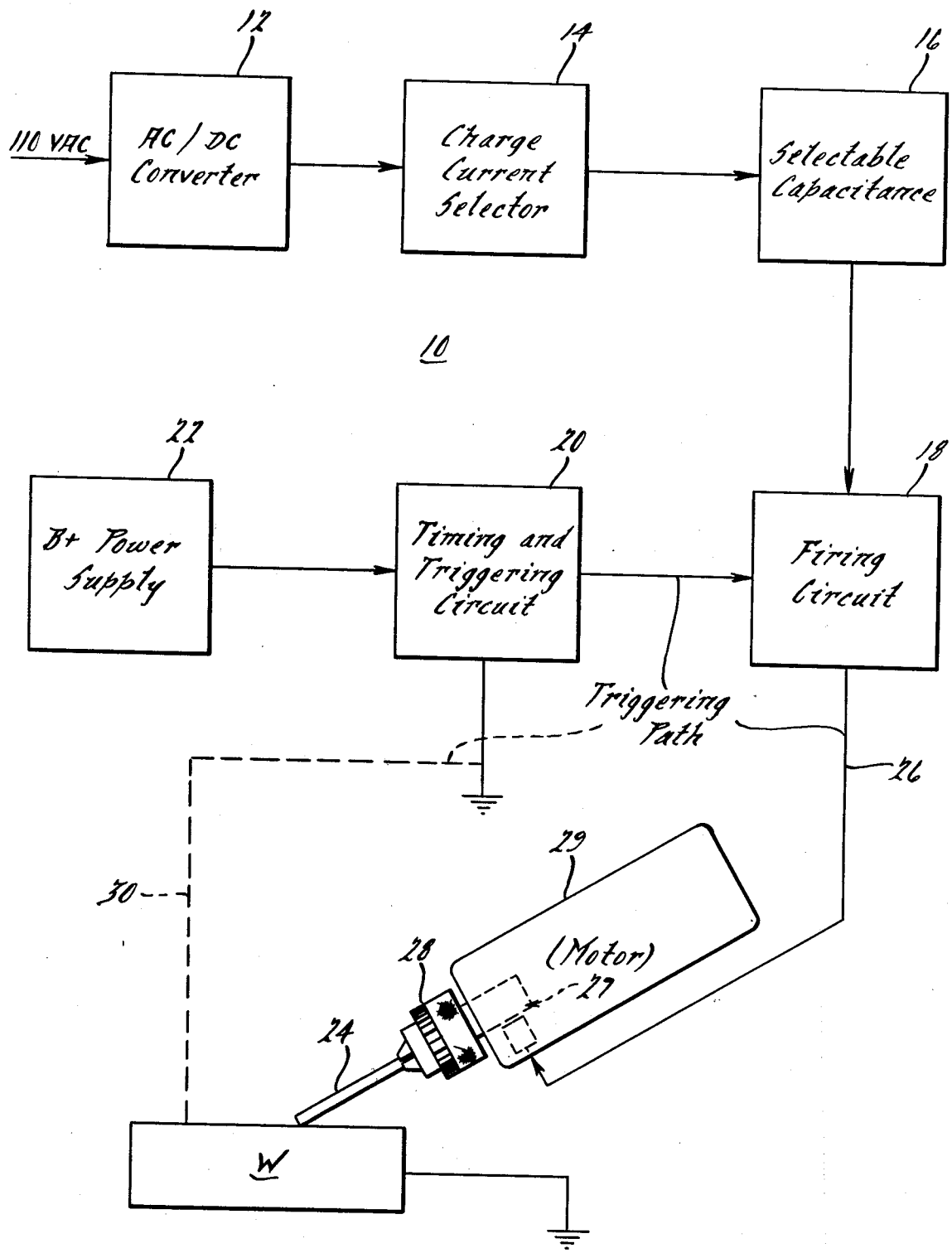
FIG. 1 is a block diagram of an apparatus according to the present invention.

In FIG. 1, surface alloying apparatus 10 is illustrated which has a safety circuit according to the present invention. The circuit 10 is adapted forming an alloy on the surface of a workpiece W.

The surface alloying apparatus 10 includes an AC to DC converter 12 which receives AC line current at 110 volts and converts the 110 volt AC line current to a DC filtered current at approximately 110 volts. The DC current is received by a charge current selector 14 which provides a DC charge current at a level which is selected by the operator. The DC charge current is received by a selectable capacitance circuit 16 which essentially comprises one or more capacitors connected in parallel having a total value of capacitance which is selected by the operator. The selectable capacitance 16 is in turn connected to a firing circuit 18 which is preferably a solid state switch. The firing circuit 18 is closed at repetitive times under the control of a timing and triggering circuit 20. The timing and triggering circuit 20 is powered by a B+ power supply 22. Upon firing of the firing circuit 18, charge stored in the capacitors of selectable capacitance 16 is delivered to an electrode 24 so long as the electrode 24 is in engagement with the workpiece W. Electrode 24 is connected to an output conductor 26 via a brush structure 27. The electrode 24 may be secured in a chuck 28 for rotation thereof by an electrode rotating apparatus 29.

According to the present invention, the firing circuit 18 cannot be fired until the electrode 24 is in contact with the workpiece W. Particularly, the timing and triggering circuit 20 is so connected to the firing circuit 18 such that the current path for triggering pulses for firing the firing circuit 18 is not completed until the electrode 24 engages the workpiece W. Upon such engagement, the triggering path is completed through output conductor 26, brush structure 27, the electrode 24, the workpiece W, and a ground connection between the workpiece W and the timing and triggering circuit 20 as represented by dashed line 30.

In FIG. 2, the surface alloying apparatus 10 is shown in circuit from. The AC to DC converter 12 is seen to comprise a full wave rectifier having diodes D1-D4 and a filter having capacitors C1 and C2. The full wave rectifier converts the incoming AC voltage to a DC voltage while the capacitors C1 and C2 provide a relatively smooth DC waveform.

The charge current selector consists of a series connection of four resistors R1-R4 having taps 1 through 4 intermediate respective pairs of resistors R1-R4. A movable contact 32 is adapted to sequentially engage respective ones of the taps 1 through 4. A fifth tap 5 is provided to connect the movable contact 32 to ground via a resistor R5 and serves as an off position for the apparatus. In the off position, any remaining charge on the selectable capacitance 16 is bled to ground through the resistor R5.

The selectable capacitance 16 is connected to the movable contact 32. The selectable capacitance 16 includes parallel-connected capacitors C3 and C4. Capacitors C3 and C4 are connected so as to receive DC current from the charge current selector 14 at a level established by the position of the movable contact 32 relative to taps 1 through 4. Particularly, the highest charge current is selected when the movable contact 32 is in engagement with tap 1 since the series resistance is least at tap 1. When the movable contact 32 is in engagement with tap 2 et seq, the series resistance will be greater and the charge current will be correspondingly less. Therefore, when the movable contact 32 is in engagement with tap 1, the rate of charge on capacitors C3 and C4 is greater than if the movable contact 32 is in engagement with taps 2 et seq. Capacitor C4 may be disconnected from the circuit by opening switch S1 to reduce the amount of storage capacity of the selectable capacitance 16.

The firing circuit 18 has a controlled conduction device 34 which may be an SCR as shown. The anode of the SCR is connected to the movable contact 32 and to the parallel connection of capacitors C3 and C4 of selectable capacitance 16. The cathode of SCR 34 is connected to the electrode 24 via output conductor 26. The gate of SCR 34 is connected to the timing and triggering circuit 20. It will be appreciated that a triggering pulse which renders the gate of SCR 34 positive relative to its cathode will cause conduction of the SCR 34 to discharge the capacitors C3 and C4 of the selectable capacitance 16 into the electrode 24 via the conductor 26.

The timing and triggering circuit 20 is essentially a unijunction timer including a unijunction transistor 38. The unijunction transistor 38 has its emitter connected to the junction of an RC timing circuit comprising variable resistor R7, resistor R6 and capacitor C7. Capacitor C7 is charged via resistors R7 and R6 at a rate dependent upon the setting of variable resistor R7. When the charge level of capacitor C7 reaches the switching point of the unijunction transistor 38, the unijunction transistor 38 conducts between base (1) and base (2) thereby providing a pulse to a pulse transformer 40. The pulse transformer 40 has one terminal 40a of its output winding connected to the gate of SCR 34. The other terminal 40b of the output winding of pulse transformer 40 is not connected directly to the cathode of SCR 34 as can be seen in FIG. 2. Rather, the other terminal 40b of the output winding of the pulse transformer 40 is connected to ground via a diode D10.

The power supply 22 for the timing and triggering circuit 20 consists of a stepped down transformer 42, a full wave rectifier having diodes D5-D8, filter capacitors C5 and C6 and voltage regulator 44 which maintains a 24 volt DC potential for operation of the timing and triggering circuit 20.

In the operation of the apparatus 10, the capacitors C3 and C4 of the selectable capacitance 16 are charged by current from the charge current selector 14, which in turn receives current from the AC/DC converter 12. The capacitors C3 and C4 are repetitively discharged through the SCR 34 of the firing circuit 18 into the electrode 24 should the appropriate triggering conditions exist.

If the electrode 24 is in electrical engagement with the workpiece W, a current path for triggering pulses from the pulse transformer 40 is provided between the gate and cathode of the SCR 34 via conductor 26, electrode 24, workpiece W, the ground path 30, diode D10 and the output winding of pulse transformer 40. Consequently, a complete path for the triggering pulse delivered by the output winding of pulse transformer 40 exists between the gate and cathode of SCR 34 such that SCR 34 may be fired to energize electrode 24 by discharging capacitors C3 and C4 into the electrode 24. However, should the electrode 24 not be in electrical engagement with the workpiece W, this path is broken such that a triggering pulse at the output winding of pulse transformer 40 is not applied across the gate and cathode of SCR 34. Consequently, SCR 34 remains in an open circuit conditions and electrode 24 is not energized. Therefore, electrode 24 may be safely handled by the operator without the danger of electrical shock.

In essence, the timing and triggering circuit 20 is responsive to an engagement of the electrode 24 with a grounded member, i.e., a member having low impedance to ground since completion of the triggering circuit for the triggering pulses requires a connection through a ground path. Since the workpiece W is grounded, engagement of the electrode 24 with the workpiece W provides a low impedance to ground at the electrode 24 so as to enable firing of the firing circuit 18.

When the system 10 is operating in the surface alloying mode, there is an inherent limitation on the potential at the electrode 24 by virture of the sparking/shorting effect between the electrode 24 and workpiece W. Hence, the system 10 is still in a safe condition during its surface alloying mode of operation.

Although the invention has been described relative to a surface alloying machine, it will be appreciated that the principles of this invention may be applied to other machines such as welding, electro-discharge machining and plating machines. Consequently, the present invention is applicable to such machines. Therefore, the scope of this invention is to be measured by the appended claims.

What is claimed is:

1. For an apparatus including an electrode adapted to be electrically energized and to engage a workpiece to perform an operation upon said workpiece, and energization means for electrically energizing said electrode including controlled conduction means having a control terminal and at least one other terminal for causing energization of said electrode and triggering circuit means connected between said control terminal and said other terminal for providing a triggering signal to said controlled conduction means for causing said controlled conduction means to conduct to cause energization of said electrode, the improvement comprising:

said triggering circuit means being series connected in circuit with said electrode and said workpiece so as to open circuit said triggering circuit means when said electrode is not engaged with said workpiece and to close circuit said triggering circuit means when said electrode is engaged with said workpiece thereby being responsive to the electrical engagement of said electrode to said workpiece for preventing the energization of said electrode by said energization means when said triggering circuit means is open circuited consequent said electrode being not electrically engaged with said workpiece and for causing the energization of said electrode by said energization means when said triggering circuit means is closed circuited consequent said electrode being electrically engaged with said workpiece, said triggering circuit means being associated with said controlled conduction means such that said triggering signals for causing conduction of said controlled conduction means are provided to said controlled conduction means only when said trigger circuit means is closed circuited by electrical engagement of said electrode and said workpiece.

2. For a surface alloying apparatus including an electrode adapted to be electrically energized and to engage a workpiece to form an alloy upon the surface of said workpiece, and energization means for said electrode including storage means for storing electrical energy and firing means connected between said storage means and said electrode for repetitively providing electrical energy stored by said storage means to said electrode including controlled conduction means having a control terminal and at least one other terminal for causing energization of said electrode and triggering circuit means connected between said control terminal and said other terminal for providing a triggering signal to said controlled conduction means for causing said controlled conduction means to conduct to cause energization of said electrode, the improvement comprising: said triggering circuit means being series connected in circuit with said electrode and said workpiece so as to open circuit said triggering circuit means when said electrode is not engaged with said workpiece and to close circuit said triggering circuit means when said electrode is engaged with said workpiece thereby being responsive to the electrical engagement of said electrode to said workpiece for preventing firing of said firing means when said triggering circuit means is open circuited consequent said electrode being not electrically engaged with said workpiece and for causing firing of said firing means when said triggering circuit means is closed circuited consequent said electrode being electrically engaged with said workpiece, said triggering circuit means being associated with said controlled conduction means such that said triggering signals for causing conduction of said controlled conduction means are provided to said controlled conduction means only when said trigger circuit means is closed circuited by electrical engagement of said electrode and said workpiece.

* * * * *